United States Patent [19]
Morris et al.

[11] Patent Number: 5,839,268
[45] Date of Patent: Nov. 24, 1998

[54] ACTIVE HYDRAULIC ROTOR DAMPING

[75] Inventors: Robert J. Morris, Port Saint Lucie, Fla.; Ronald Marmol, Madison, Ala.; Paul E. McClure, Jupiter, Fla.; Margaret Ann Owen; Wesley B. Owen, both of Juno Beach, Fla.; Carl F. Weiss, West Palm Beach, Fla.

[73] Assignee: United Technologies Corporation, Hartford, Conn.

[21] Appl. No.: 434,464

[22] Filed: May 4, 1995

[51] Int. Cl.⁶ .......................................... F02C 7/00
[52] U.S. Cl. .................... 60/39.02; 60/39.24; 384/99; 415/119
[58] Field of Search .................. 60/39.02, 39.08, 60/39.24, 39.75; 415/119, 174.1, 175; 384/99, 274

[56] References Cited

U.S. PATENT DOCUMENTS

| | | |
|---|---|---|
| 3,442,560 | 5/1969 | DeGast .................................... 384/5 |
| 4,213,661 | 7/1980 | Marmol . |
| 4,952,076 | 8/1990 | Wiley et al. . |
| 4,971,457 | 11/1990 | Carlson . |
| 4,971,458 | 11/1990 | Carlson . |
| 4,981,415 | 1/1991 | Marmol et al. . |
| 5,584,463 | 12/1996 | Swann et al. ......................... 384/99 |

Primary Examiner—Louis J. Casaregola
Attorney, Agent, or Firm—Robert E. Greenstien

[57] ABSTRACT

The compressor shaft in a gas turbine engine is supported on a bearing having four independently hydraulically pressurized cells. The pressure in the cells is controlled by a signal processor based on engine operating parameters, including stall margin and blade tip to compressor case clearance.

19 Claims, 4 Drawing Sheets

ACTIVE HYDRAULIC ROTOR DAMPING

TECHNICAL FIELD

This invention relates to bearing supports, in particular, active hydraulic bearing supports that supporting high speed rotating machinery, such as the compressor and turbine rotors in a gas turbine engine.

BACKGROUND OF THE INVENTION

The efficiency of gas turbine engine compressors and turbines is directly related to the blade tip to airseal clearance, the space between the end of the compressor blades and the case or endwall. Ideally, the clearance should be minimal; equally important, it should be uniform. Extremely high forces are generated from the high rotational speeds in a compressor and turbine, leading, at times, to excessive rotor-to-case radial deflections, blade tip to airseal rubs and reduced compressor and turbine efficiency.

Surge or stall arises from operating the compressor in a region of aerodynamic instability. The instability may be the product of rotor speed (snap) transients and inlet pressure distortions. Aerodynamically, the compressor operates along an operating or so-called "op-line" on the compressor map. The relative difference, if any, between the op-line and the compressor stall line is considered the stall margin. During rotor speed (N1, N2) transients and instances of inlet pressure (P1) distortion, the compressor stall line and op-line overlap, that convergence explaining the loss of stall margin, and, on occasion, a compressor stall.

A consequence of compressor stall is a consequence of an out of phase asymmetrical pressure loading of the compressor rotor. Subsequently, rotor-to-case closure occurs and the blade tips rub on the outer seal, the damage leading to permanently enlarged clearances and permanently reduced compressor efficiency.

Aircraft maneuvers can also produce excessive blade-to-case clearance. All aircraft, but especially military aircraft, are susceptible to blade tip rubs from flight maneuvers, changes in yaw and pitch, for example. Engine rotors are ostensibly thin disks that are connected to each other by a shaft. During aircraft maneuvers, the mass and moment of inertia of the disks generate substantial lateral forces and moments, defined by these expressions:

$$Vy=W \cdot gy$$

$$Vz=W \cdot gz$$

$$Mx=Ixx\Phi''+(Izz-Iyy)\Psi''\theta$$

$$My=Iyy\theta''+Ixx\,\omega\Psi'$$

$$Mz=Izz\Psi''-Ixx\omega\theta'+(Iyy-Ixx)\Phi'\theta'$$

where:
Vy=force in the horizonal plane
Vz=force in the vertical plane
gy=horizontal load factor
gz=vertical load factor
W=rotor mass
Mx=moment about the aircraft roll axis
My=moment about the aircraft pitch axis
Mz=moment about he aircraft yaw axis
Ixx=mass moment of inertial about the roll axis
Iyy=mass moment of inertia about the pitch axis
Izz=mass moment of inertia about the yaw axis
$\theta'$=aircraft pitch velocity
$\theta''$=aircraft pitch acceleration
$\Psi'$=aircraft yaw velocity
$\Psi''$=aircraft yaw acceleration
$\Phi'$=aircraft roll velocity
$\Phi''$=aircraft roll acceleration
$\omega$=engine shaft speed If these forces and moments are large enough, the engine shaft supports can be insufficient to constrain lateral (radial) disk deflection, producing blade tip rubs, permanently reducing aerodynamic efficiency.

All compressor and turbine rotors are attached to rotating shafts that are supported on bearing that typically have bearing rollers or balls separating inner and outer races. Nevertheless, in some engines, passive oil film dampers are used, a type in which the stationary load supporting race is supported on chambers containing pressurized oil. U.S. Pat. No. 4,971,457 show this technique.

SUMMARY OF THE INVENTION

Among the objects of the present invention is to provide a real-time, adaptive, active bearing support system for gas turbine engine compressor and turbine rotors, one that restrains and positions the bearing shaft based on actual flight conditions and rotor and/or blade tip deflections.

According to the invention, a hydraulic bearing support is used to support the compressor rotor and contain a plurality of individually hydraulically pressurized cells connected to respective hydraulic supplies that are controlled by a signal processor or microprocessor that senses a plurality of engine and aircraft parameters. The signal processor computes the engine stall margin and the impact of engine and aircraft transients that may reduce stall margin. When the signal processor determine that stall margin has been lost and a stall is probable, it provides signals to each cell to provide a flow of high pressure fluid, which stiffens the rotor shaft support so that the radial deflections are held to acceptable levels that avoid blade tip rubs.

According to the invention means are also provided to reduce engine rotor lateral deflections that are induced by aircraft maneuvers. The signal processor, receiving engine and aircraft parameters, computes the expected maneuver forces and moments that will be produced during the maneuver and then commands fluid flow to each cell to produce an aggregate force that counteracts the expected maneuver induced forces.

According to the invention, the signal processor senses engine shaft and/or blade tip deflection to produce an error signal indicating the magnitude of change in the clearance. The cells are pressurized to null error.

The invention provides a superior way to support compressor and turbine disks, one that prevents blade tip rubs. Other objects, features and benefits of the invention will be apparent to one skilled in the art from the following discussion.

BEST MODE FOR CARRYING OUT THE INVENTION

Figure 1:
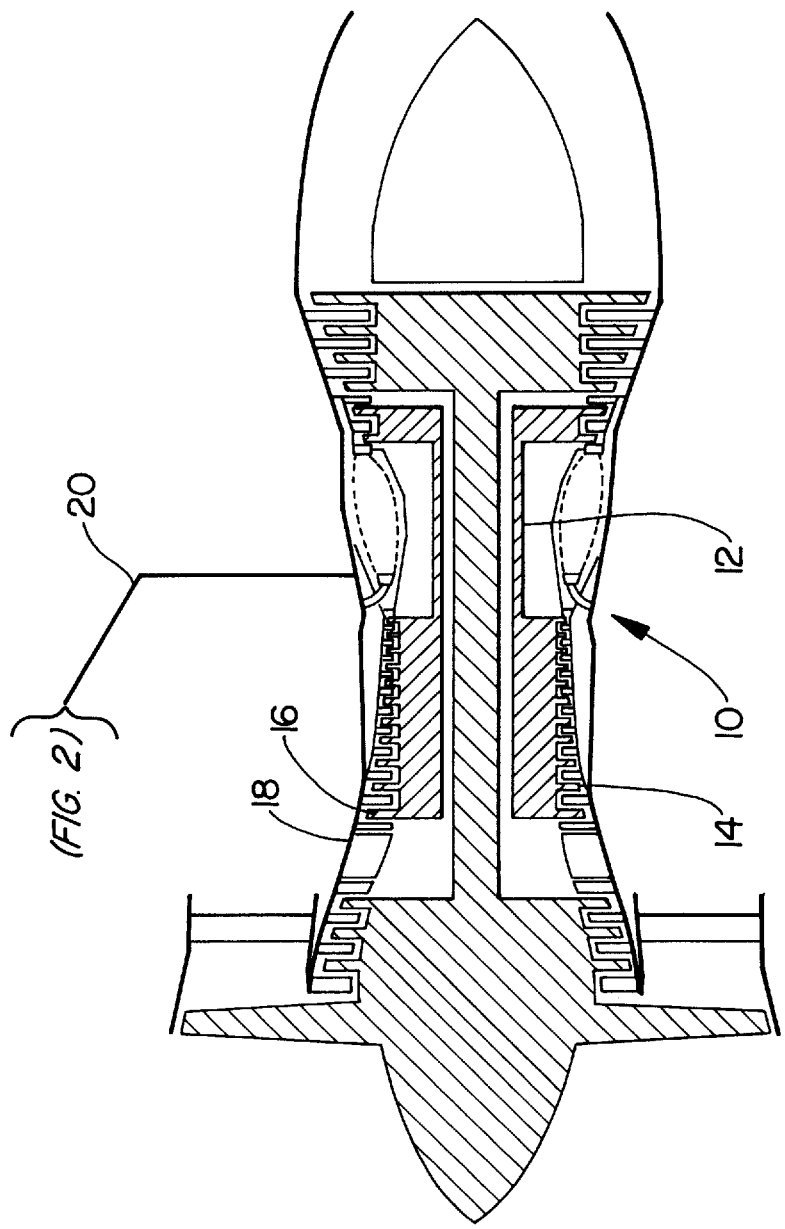
FIG. 1 is a cross-section of a gas turbine engine.
Figure 2:
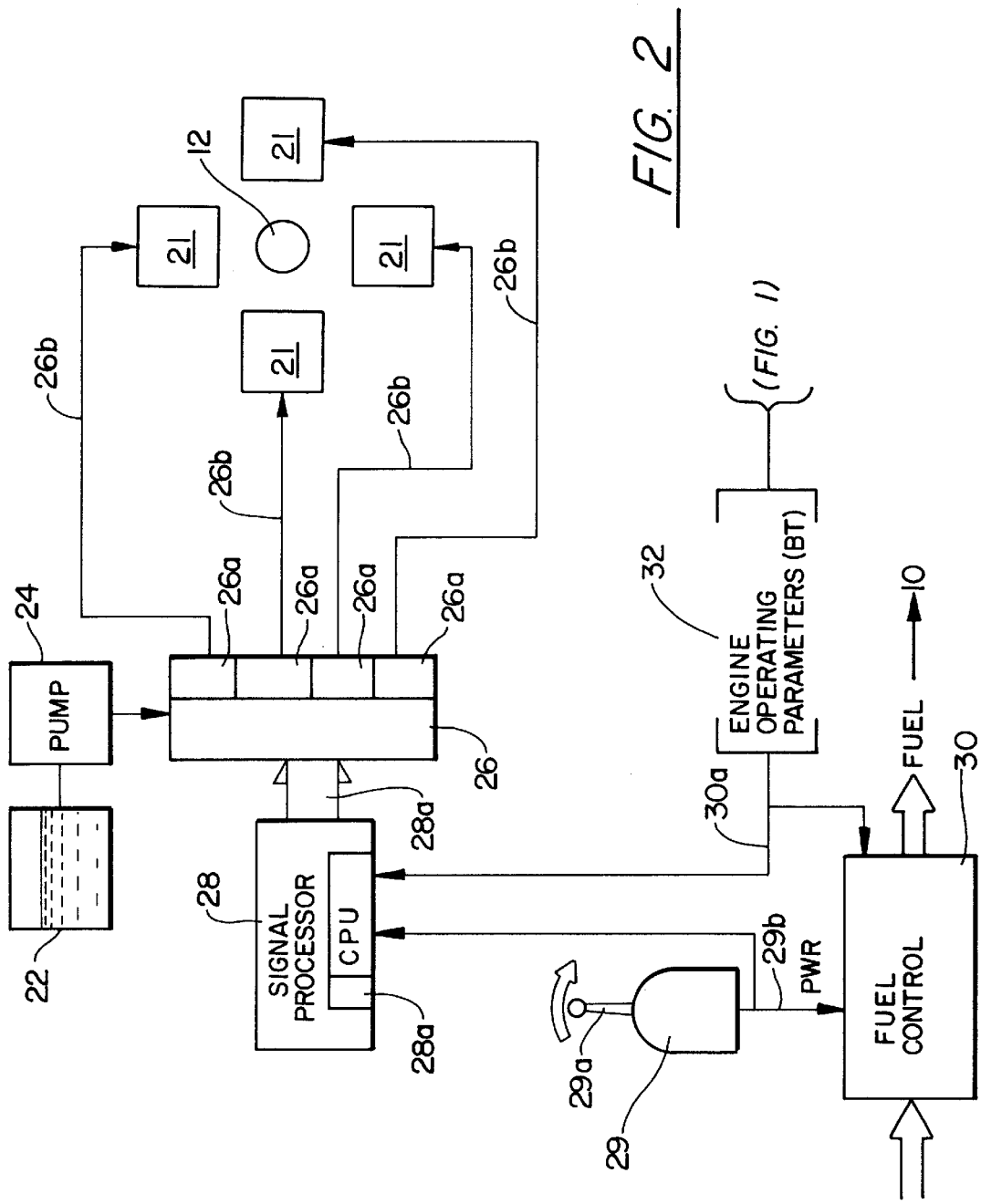
FIG. 2 is a functional block diagram of an active damping system according the present invention.
Figure 4:
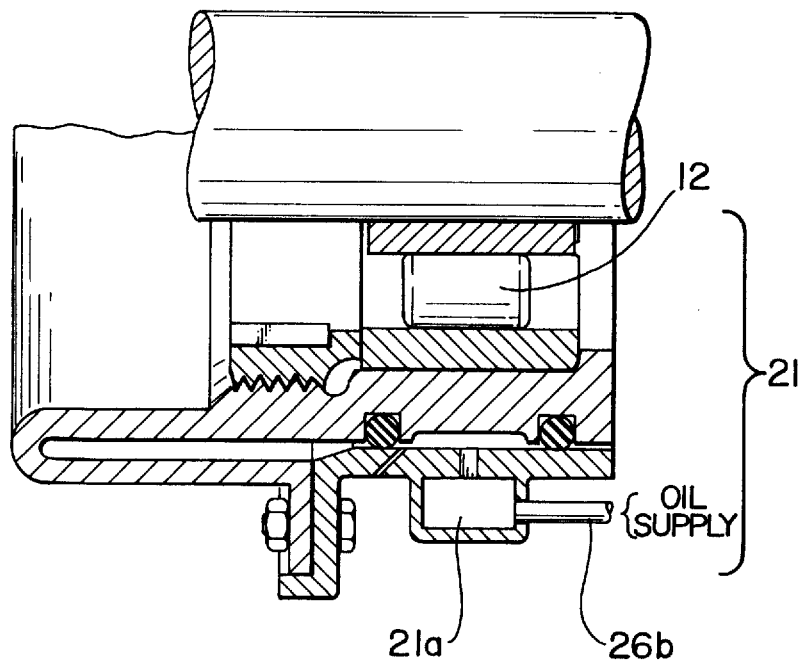
FIG. 4 is a partial section of a fluid damped bearing that can be used to support a rotating part to carry out the invention.

FIG. 1 shows a gas turbine engine 10 having a compressor shaft 12 carrying a plurality of compressor disks 14. Each disk contains blades 16 spaced away from the case or endwall 18. The shaft 12 is supported on an active hydraulic bearing 20, an example of which is shown in FIG. 4 and described in detail in U.S. Pat. No. 4,971,457. The bearing 20 contains four individual elements or cells 21 at quadrature locations around the bearing 20. Each cell received hydraulic fluid from a reservoir 22 by a pump 24 through a manifold 26 that includes a valve 26a to control the flow of fluid individually to each cell 21. An hydraulic control 28 is controlled by a CPU or signal processor to provide signals, over the line 28a to the manifold 26 to control the flow of hydraulic fluid to each valve 26a as function of a number of engine operating conditions to vary the force applied by each cell 21 to the shaft 20 by controlling the fluid pressure in the cell. A throttle 29 includes a power lever 29a to provide a commanded engine thrust signal on line 29b to a fuel control 30. The fuel control 30 provides fuel to the engine, controlling the magnitude as a function of the commanded thrust signal PWR on the line 29b and a plurality of engine operating parameters, supplied on the line 30a, among them N1, N2, P1, T1, each well known indicators of the instantaneous engine operating condition.

It can be appreciated from FIG. 4 that, depending upon computations made by the signal processor 28 as explained below, the pressure in chamber 21 is increased or decreased, and the pressure in the chamber for each cell 21 is individually controlled as explained before, effectively thrusting the shaft 12 in one direction or holding the shaft 12 more rigidly in place if the pressure in all the cells is raised equally.

Figure 3:
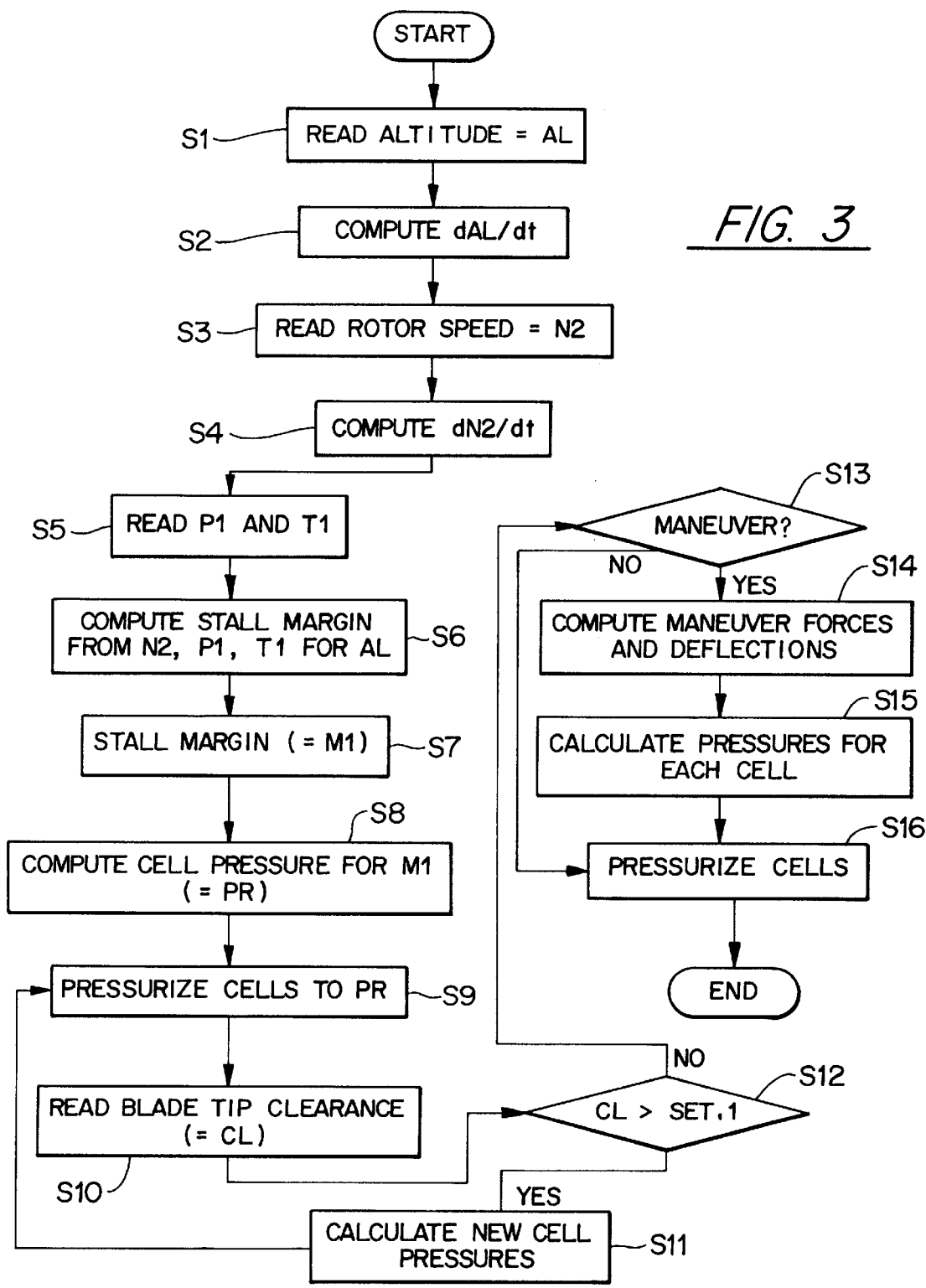
FIG. 3. is a flowchart showing signal processing steps for controlling the damping system shown in FIG. 1.

FIG. 3 shows signal processing steps than can be incorporated into a program run by the CPU, the program being stored in the memory 28a. At step S1, the aircraft altitude AL is read as one of the many available "engine operating" parameters 32. The next step, S2, computes the first derivative of AL. At step S3, the compressor speed N2 is read and its derivative is determined by the CPU at step S4. Next the inlet pressure P1 and temperature T1is read at step S5. With AL, N2, P1 and T1 as stored values, the CPU accesses stored data points that define the engine operating line as a function of those values. This produces a value M1 in step S8, the stall margin. It is assumed that a lookup table has been written to the CPU memory 28a, table associating an overall cell pressure PR for each cell. The signal processor 28 then instructs the manifold 26 to pressurize each cell to PR and hold that pressure until it is commanded to increase or decrease the pressure. In this way, the shaft 12 is supported more rigidly based on the stall margin, so that there will be less radial disk movement if a stall takes place, which can allow the blades to actually rub against the endwall 18.

Figure 5:
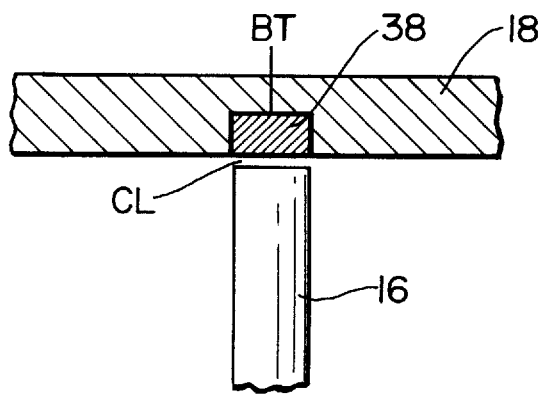
FIG. 5 shows a section of a compressor case or endwall having a blade proximity detector adjacent a blade tip.

An additional test is made at step S10 for the blade tip clearance CL, as shown in FIG. 5. This uses a signal BT from a detector 38 that produces the BT with a magnitude that represents the clearance CL. Step S12 tests if the clearance exceed a stored value SET. An affirmative answer, prompts the signal processor 28 to recompute the cell pressure PR based up a lookup table, stored in the memory 28, to reduce the clearance so that step S12 will produce a negative answer when the test is next made in a subsequent process cycle. A negative answer moves the sequence to step S13, where the signal processor tests to determine if the aircraft is in a "maneuver", an operational mode in which the aircraft or engine is in a dynamic state: engine speed is changing and/or aircraft pitch or yaw is changing. In addition, a maneuver includes the launch of a weapons system, which can cause changes to P1 and T1. It has been assumed that the signal processor is provided with such anticipatory information as one of the "engine parameters". In other words, as the aircraft is flying, the pilot initiates a turn and climb by pressing a force stick to one side and slightly aft. To maintain speed, the engine will be accelerated. It is assumed that the signal processor is provided with information from a master electronic flight control system, the information (signals) indicating the magnitude and direction of those changes. If the test at step S13 is negative, meaning that a maneuver is not taking place, the cell pressures are maintained at step S16 and the sequence is exited at END. A positive answer to step S13 prompts the signal processor to compute the cell pressures at step S14 based on those maneuvers using stored look-up tables containing suggested cell pressures for the predicted effect on shaft radial position for each maneuver based on the forces and momentums computed, on the fly, by the CPU using the equations set forth in the background section above. The signal processor sums the results for each cell and in step S15 calculates the correct pressure for each cell. At step S16 the latest pressure for each cell is commanded and maintained. The last step obviously can find the difference between the cell pressure at time $t_0$ and at subsequent time $t_1$ when the maneuver is started, to compute the amount by which the pressure is to be increased or decreased from the cell pressure prior to the time that the maneuver is started.

With the benefit of the previous discussion of the invention, one of ordinary skill in the art may be able to modify the invention in whole or in part without departing from the true scope and spirit of the invention.

We claim:

1. A gas turbine engine, characterized by:
   a compressor shaft;
   a bearing having a plurality of hydraulic cells supporting said shaft, each hydraulic cell having an independent inlet for hydraulic fluid;
   a hydraulic control for providing hydraulic fluid at a pressure to each inlet in response to bearing signals individually supplied for each hydraulic cell, the magnitude of each bearing signal determining the pressure in a hydraulic cell;
   signal processing means for receiving engine signals indicating engine operating parameters, for determining from said signals a moment on said shaft, and for providing said bearing signals with individual magnitudes to create an equally, opposing moment on said shaft; and
   means for providing said engine signals.

2. A gas turbine as described in claim 1, further characterized in that:
   said signal processing means comprises means for producing a signal that indicates the magnitude of compressor stall margin, for providing said bearing signals in equal magnitudes when said stall margin signal reaches a stored value.

3. A gas turbine engine as described in claim 2, further characterized in that:

said signal processing means comprises means for providing a signal indicating a computed compressor shaft load for a selected plurality of said engine signals indicating rates of engine speed changes and for providing said bearing signals with individual magnitudes to pressure said chambers with to create an aggregate opposing force to said computed compressor shaft load.

4. A gas turbine engine as described in claim 3, further characterized by:

means for providing a clearance signal indicating the clearance between a blade tip and a compressor case; and said signal processing means comprising means for receiving said clearance signal and providing said bearing signals with magnitudes that pressurize said cells to change said clearance as a function of the magnitude of said clearance signal.

5. A gas turbine engine as described in claim 1, further characterized in that:

said signal processing means comprises means for providing a signal indicating a computed compressor shaft load for a selected plurality of said engine signals indicating rates of engine speed changes and for providing said bearing signals with individual magnitudes to pressure said chambers with to create an aggregate opposing force to said computed compressor shaft load.

6. A gas turbine engine as described in claim 1, further characterized by:

means for providing a clearance signal indicating the clearance between a blade tip and a compressor case; and said signal processing means comprising means for receiving said clearance signal and providing said bearing signals with magnitudes that pressurize said cells to change said clearance as a function of the magnitude of said clearance signal.

7. A gas turbine engine, characterized by:

a compressor shaft;

means for providing a plurality of engine operating signals;

means for providing hydraulic force to said shaft from a plurality of locations around the shaft, said hydraulic force being independently variable at each location in response to a hydraulic input;

means for providing said hydraulic input in response to a control signal produced for each location; and signal processing means comprising means for receiving said signals indicating engine operating parameters for determining from said signals indicating engine operating conditions a direction for loading on said shaft, and for providing said control signal for each location to achieve said loading.

8. A gas turbine engine as described in claim 7, further characterized by:

means for providing a first signal indicating a distance from a compressor blade tip on said shaft and a compressor wall in said engine;

said signal processing means comprising means for activating a second signal in response to said first signal exceeding a value and for providing said control signal for each location at a magnitude that causes said second signal to be deactivated.

9. A gas turbine engine as described in claim 8, further characterized by:

said signal processing means comprising means for providing a compressor stall margin signal from said engine operating parameters; and for increasing the magnitude of said control signal produced for each said location when said compressor stall margin signal is less than a stored value.

10. A gas turbine engine as described in claim 9, further characterized in that:

said signal processing means comprises means for equally increasing the values of said control signals when said compressor stall margin signal is less than said stored value.

11. A gas turbine engine as described in claim 7, further characterized by:

said signal processing means comprising means for determining from said engine operating signals a directional load on said shaft and for providing said control signals in individual magnitudes to counteract said directional load.

12. A method for controlling a gas turbine engine characterized by:

supporting a compressor shaft on a plurality of hydraulic cells, each cell having a input for hydraulic fluid; and providing hydraulic fluid at different pressures to each cell in response to an input signal manifesting a pressure;

providing said input signal in response to engine operating parameters manifesting an expected moment on the shaft, said input signals being calculated to achieve a desired combination of shaft support forces by said cells to counteract said expected momement.

13. A method for controlling a gas turbine engine as described in claim 12, characterized by:

computing compressor stall margin and increasing the pressure in each cell if compressor stall margin is below a first magnitude to stiffen shaft support by said hydraulic cells.

14. A method for controlling a gas turbine engine as described in claim 12, characterized by:

measuring compressor blade to case clearance and producing a second signal that indicates that magnitude of said blade to case clearance is less than a second value; and adjusting the pressure in said cells to remove said second signal.

15. A method for controlling a gas turbine engine as described in claim 14, further characterized by:

computing compressor stall margin and increasing the pressure in each cell if compressor stall margin is below a first magnitude to stiffen shaft support by said hydraulic cells.

16. A method for controlling a gas turbine engine as described in claim 12, further characterized by:

computing the moment on the shaft; and providing said input signal at a magnitude for each cell so that the sum of forces from said cells opposes and said moment equals zero.

17. A method for controlling a gas turbine engine as described in claim 13, further characterized by:

computing the moment on the shaft; and providing said input signal at a magnitude for each cell so that the sum of forces from said cells opposes and said moment equals zero.

18. A method for controlling a gas turbine engine as described in claim 14, further characterized by:

computing the moment on the shaft; and providing said input signal at a magnitude for each cell so that the sum of forces from said cells opposes and said moment equals zero.

19. A method for controlling a gas turbine engine as described in claim 15, further characterized by:

computing the moment on the shaft; and providing said input signal at a magnitude for each cell so that the sum of forces from said cells opposes and said moment equals zero.

* * * * *